United States Patent
Bagheri et al.

(10) Patent No.: US 11,432,276 B2
(45) Date of Patent: Aug. 30, 2022

(54) DOWNLINK CONTROL FOR ULTRA RELIABLE COMMUNICATIONS

(71) Applicant: Lenovo (Singapore) Pte. Ltd., New Tech Park (SG)

(72) Inventors: Hossein Bagheri, Urbana, IL (US); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 128 days.

(21) Appl. No.: 16/899,897

(22) Filed: Jun. 12, 2020

(65) Prior Publication Data
US 2020/0314823 A1 Oct. 1, 2020

Related U.S. Application Data

(63) Continuation of application No. 16/191,260, filed on Nov. 14, 2018, now Pat. No. 10,728,887.
(Continued)

(51) Int. Cl.
*H04W 72/04* (2009.01)
*H04L 69/324* (2022.01)
(Continued)

(52) U.S. Cl.
CPC ......... *H04W 72/042* (2013.01); *H04L 1/0061* (2013.01); *H04L 1/0072* (2013.01);
(Continued)

(58) Field of Classification Search
CPC ........... H04W 72/0446; H04W 72/042; H04W 72/14; H04L 69/324; H04L 1/0061; H04L 1/0072; H04L 5/0053; H04L 5/0094
See application file for complete search history.

(56) References Cited

U.S. PATENT DOCUMENTS 10,728,887 B2   7/2020   Bagheri et al.
2003/0214958 A1   11/2003   Madour et al.
(Continued)

FOREIGN PATENT DOCUMENTS

WO   2017078465 A1   5/2017

OTHER PUBLICATIONS

CATT, On sDCI design, 3GPP TSG RAN WG1 Meeting #89 R1-1707430, May 15-19, 2017, pp. 1-5.
(Continued)

*Primary Examiner* — Wei Zhao
(74) *Attorney, Agent, or Firm* — Kunzler Bean & Adamson

(57) ABSTRACT

For downlink control, a method receives by use of a processor, at User Equipment, a control channel with a first aggregation level in a Transmission Time Interval. The method attempts to decode the control channel. In response to the control channel being successfully decoded, the method determines a first downlink control information (DCI) with a first number of bits based on the received control channel; determines whether to decode the first DCI to determine a second DCI with a second number of bits based on the first DCI; and determines the second DCI with a second number of bits based on the decoded first DCI if determined to decode the first DCI. The method transmits data according to the second DCI if the second DCI is an uplink grant. The method receives data according to the second DCI if the second DCI is a downlink assignment.

20 Claims, 11 Drawing Sheets

Related U.S. Application Data

(60) Provisional application No. 62/586,084, filed on Nov. 14, 2017.

(51) Int. Cl.
*H04W 72/14* (2009.01)
*H04L 1/00* (2006.01)
*H04L 5/00* (2006.01)
*H04W 88/02* (2009.01)

(52) U.S. Cl.
CPC .......... *H04L 5/0053* (2013.01); *H04L 5/0094* (2013.01); *H04L 69/324* (2013.01); *H04W 72/0446* (2013.01); *H04W 72/14* (2013.01); *H04W 88/02* (2013.01)

(56) References Cited

U.S. PATENT DOCUMENTS

| | | | |
|---|---|---|---|
| 2015/0117271 A1* | 4/2015 | Liang | H04L 5/001 370/280 |
| 2017/0273071 A1 | 9/2017 | Nogami et al. | |
| 2018/0123769 A1 | 5/2018 | Pelletier et al. | |
| 2018/0124815 A1 | 5/2018 | Papasakellariou | |
| 2018/0332605 A1* | 11/2018 | Pelletier | H04W 72/1242 |
| 2018/0352582 A1* | 12/2018 | Yl | H04W 72/1257 |

OTHER PUBLICATIONS

Huawei Hilsilicon, "sTTI scheduling", 3GPP TSG RAN SG1 Meeting #90 R1-1712075, Aug. 21-25, 2017, pp. 1-7.

Huawei Hilsilicon, "UE procedure of PDCCH monitoring for URLLC", 3GPP TSG RAN WG1 Ad hoc Meeting R1-1709993, Jun. 27-30, 2017, pp. 1-3.

"Extended European Search Report", EPO, dated Feb. 25, 2022, pp. 1-8.

* cited by examiner

DOWNLINK CONTROL FOR ULTRA RELIABLE COMMUNICATIONS

CROSS-REFERENCE TO RELATED APPLICATIONS

This application is a continuation application of and claims priority to U.S. patent application Ser. No. 16/191,260 entitled "DOWNLINK CONTROL FOR ULTRA RELIABLE COMMUNICATIONS" and filed on Nov. 14, 2018 for Hossein Bagheri, which is incorporated herein.

FIELD

The subject matter disclosed herein relates to reliable communications

BACKGROUND

Description of the Related Art

Mobile devices may communicate based on control information.

BRIEF SUMMARY

A method for downlink control is disclosed. The method receives by use of a processor, at User Equipment, a control channel with a first aggregation level in a Transmission Time Interval. The method attempts to decode the control channel. In response to the control channel being successfully decoded, the method determines a first downlink control information (DCI) with a first number of bits based on the received control channel; determines whether to decode the first DCI to determine a second DCI with a second number of bits based on the first DCI; and determines the second DCI with a second number of bits based on the decoded first DCI if determined to decode the first DCI. The method transmits data according to the second DCI if the second DCI is an uplink grant. The method receives data according to the second DCI if the second DCI is a downlink assignment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
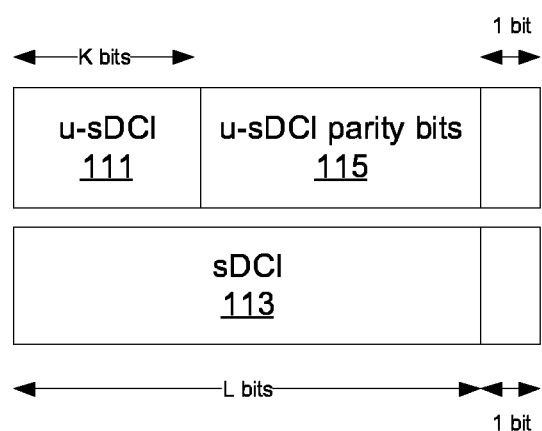
FIG. 1 is a schematic block diagram illustrating one embodiment of downlink control information size alignment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Ultra Reliable Low Latency Communication (URLLC) Aspects

The number of blind decodes in a shortened Transmission Time Interval (sTTI) is limited: e.g., 6 blind decodes per 2/3 Orthogonal Frequency Division Multiplex (OFDM) symbols, and 12 blind decodes per 7 OFDM symbol sTTI per shortened Downlink Control Information (DCI) for an sTTI operation. The sTTI operation is referred to as sTTI-O for Long Term Evolution (LTE) with sTTI. For URLLC, a smaller DCI size (URLLC DCI in an sTTI is referred herein to as u-sDCI) than sDCI can be used to be able to support lower coding rates, and hence improve the reliability of the control channel which in turn would increase the reliability of packet transmission. In such a case, there could be at least two different DCI sizes (i.e., a sDCI size and a u-sDCI size) to be monitored in an sTTI, and therefore, the number of blind decodes should be shared between the two DCI sizes, which in turn would reduce the number of blind decodes for each type of service: e.g., sTTI-O, and URLLC.

One solution for splitting the blind decodes among sTTI-O and URLCC services is to configure the number of candidates for each AL? corresponding to the URLLC service, and also the number of normal sTTI candidates for each Aggregation Level (AL) corresponding to the sTTI service Another solution is not to split the blind decodes, but use all blind decodes for both sTTI-O and URLLC services. This is generally achieved when the sDCI size and u-sDCI seizes are aligned, and sDCI and u-sDCI are differentiated e.g., via one or more bit(s) more than one bit may be needed e.g., if different reliability targets are intended for URLLC service in sDCI/u-sDCI. However, if the payloads (i.e., information bits) of sDCI and u-sDCI are very different, padding of zeros to u-sDCI is not efficient. One solution is to virtually align the sDCI and u-sDCI sizes.

FIG. 1 shows an embodiment of u-sDCI 111 and sDCI 113 size alignment. Assume u-sDCI 111 has length of "K" bits, and sDCI 113 has length of "L" bits (e.g., excluding the DCI type differentiator bit(s) described hereafter).

Figure 2:
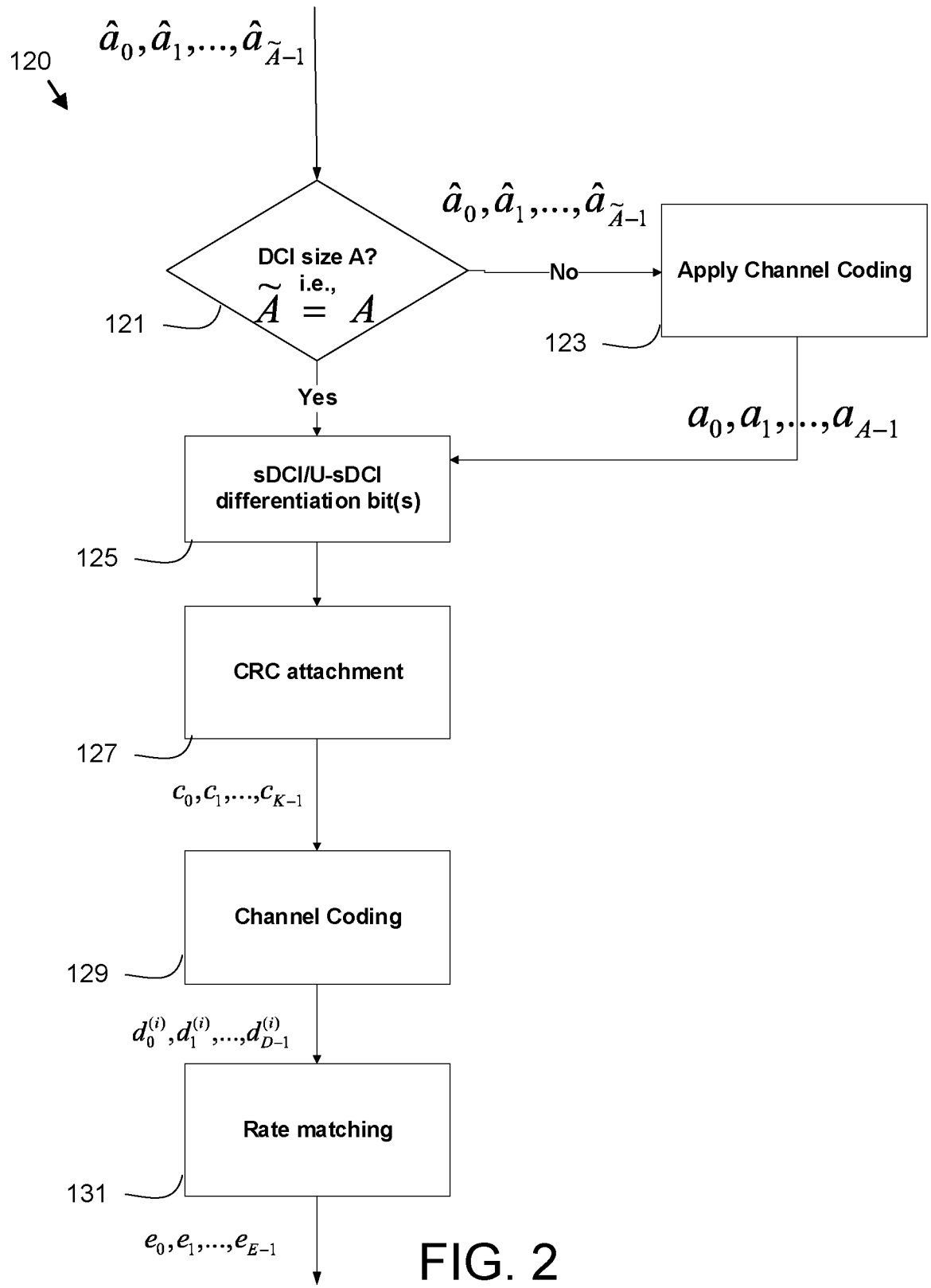
FIG. 2 is a schematic block diagram illustrating one embodiment of a processing method.

FIG. 2 is a schematic block diagram illustrating one embodiment of a processing method 120 for u-sDCI 111 and sDCI 113 size alignment. A processor may determine 121 if the u-sDCI 111 is size A, the size of the sDCI 113. If sDCI 113 is not size A, instead of applying "L-K" zeros to u-sDCI 111 to make u-sDCI 111 equal in size with sDCI 113, the processor may apply 123 an inner channel coding scheme (K→L) to u-sDCI 111, in which the number of output bits is equal to the number of bits in an sDCI 113 (i.e., "L"). The processor may further add 125 a one-bit differentiator that is not inner channel coded. In one example, one of the unused states of an DCI type field present in the sDCI 113 may be used, e.g., unused state '11' of 2-bit DCI type field may be used to indicate u-sDCI 111. In another example, the one-bit differentiator may be an unused or padding bit in the sDCI 113 or a bit that is repurposed for the DCI type differentiation. In another example, the sTTI-O sDCI 113 may be modified and extended by one-bit differentiator. The User Equipment (UE) distinguishes sDCI 113 and u-sDCI 111. If a UE detects u-sDCI 111, then the UE may apply a decoding of "L" bits to get "K" bits.

The processor may add 127 a cyclic redundancy check (CRC) attachment such as the u-sDCI parity bits 115. Different coding techniques can be used to extend "K" bits to "L" bits such as Reed-Muller, repetition code, block coding, polar coding, convolutional code, simplex code etc.

In one example, a polar code is used and the "L-K" bits are mapped to frozen bit positions of the polar kernel encoder. In one example, the additional coding includes one or more of rate matching, interleaving, and bit scrambling as part of channel coding 129. In one example, bit scrambling initialization (of a scrambling sequence (e.g., Gold sequence) is based on the DCI type.

Figure 5:
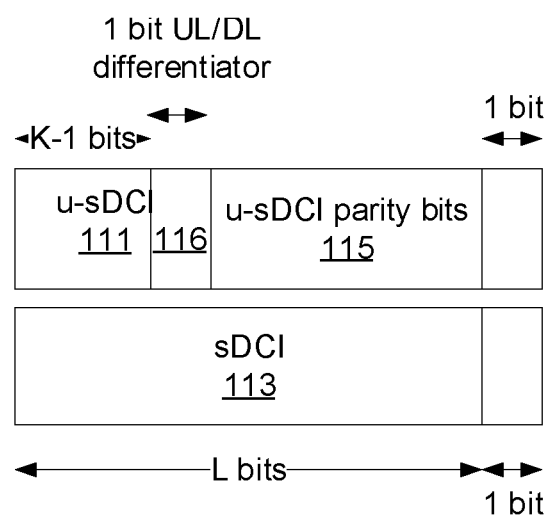
FIG. 5 is a schematic block diagram illustrating one alternate embodiment of downlink control information size alignment.

Only a part of the u-sDCI may be coded: for instance, if the size of uplink (UL) u-sDCI and downlink (DL) u-sDCI is aligned and UL vs. DL u-sDCI is distinguished based on a 1-bit distinguishing field in u-sDCI, that part may be excluded from coding as shown in FIG. 5. By coding and decoding only a part of the u-sDCI, the additional complexity due to extra coding and decoding of u-sDCI 111 may be reduced.

In the u-sDCI and sDCI size alignment, the processor may add 127 a cyclic CRC of u-sDCI parity bits 115 after the u-sDCI 111. The processor may further perform channel coding 129 and rate matching 131.

Figure 3:
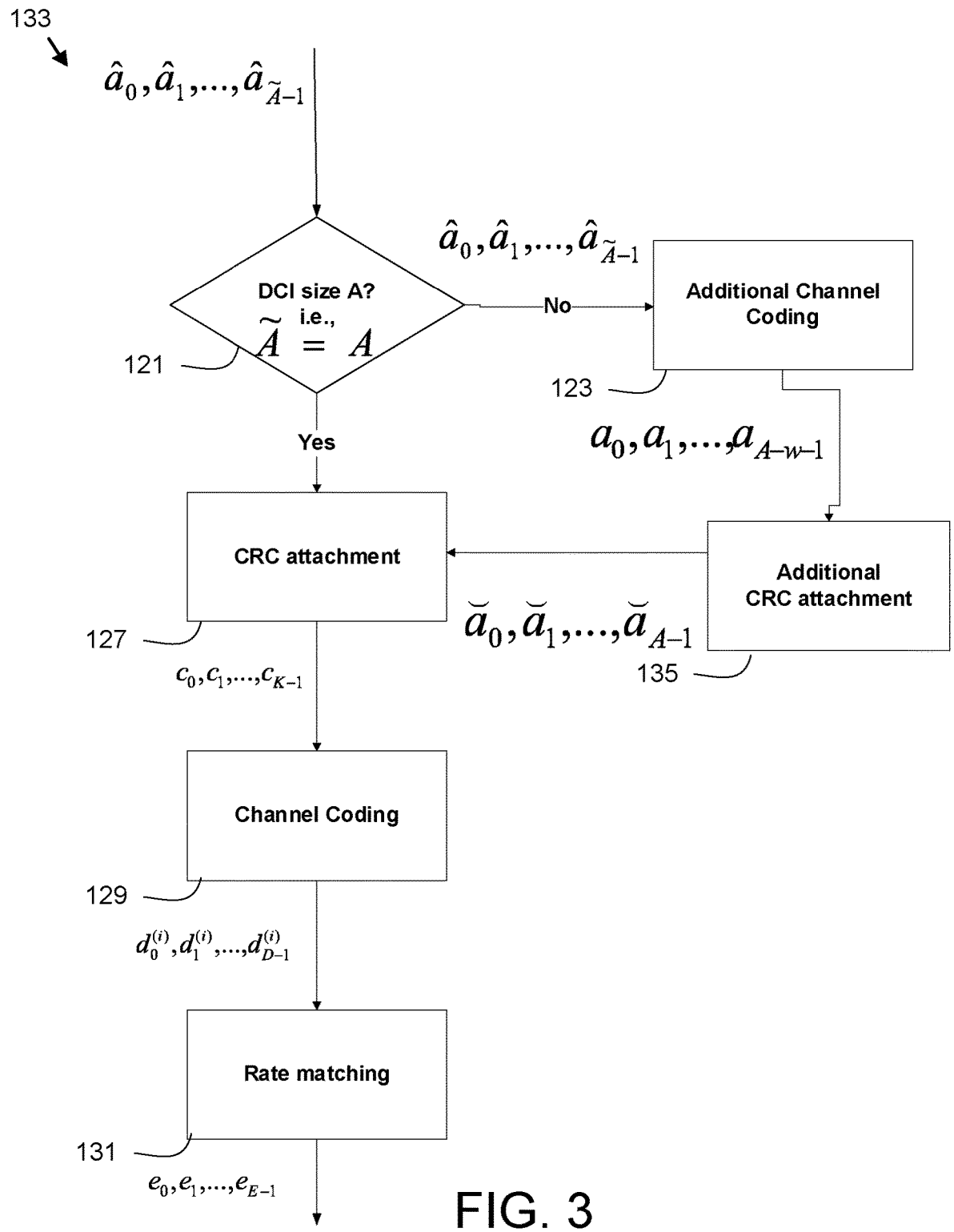
FIG. 3 is a schematic block diagram illustrating one embodiment of a coding method.

In another embodiment, illustrated in the coding method 133 of FIG. 3, CRC size can be different for sDCI 113 and u-sDCI 111. The steps of FIG. 2 are shown. However, instead of aligning sDCI and u-sDCI size after additional coding of u-sDCI 111 and before CRC attachment as shown in FIG. 2, the size of encoded u-sDCI 111 is increased 135 via additional channel coding to "A-w" bits where A-w>Ã, and after additional (partial) CRC attachment, the encoded and partial CRC attached u-sDCI becomes "A" bits. In this example, w is the additional CRC bits (e.g., 2 bits for a total of 18 CRC bits) for u-sDCI 111 compared to sDCI 113 (with a CRC of 16 bits). The size of sDCI 113 and u-sDCI 111 after channel coding 129 (variable D in FIG. 3) is the same. In one example, since the CRC sizes for sDCI 113 and u-sDCI 111 are different, no additional bit(s) is needed for DCI type differentiation.

Figure 4:
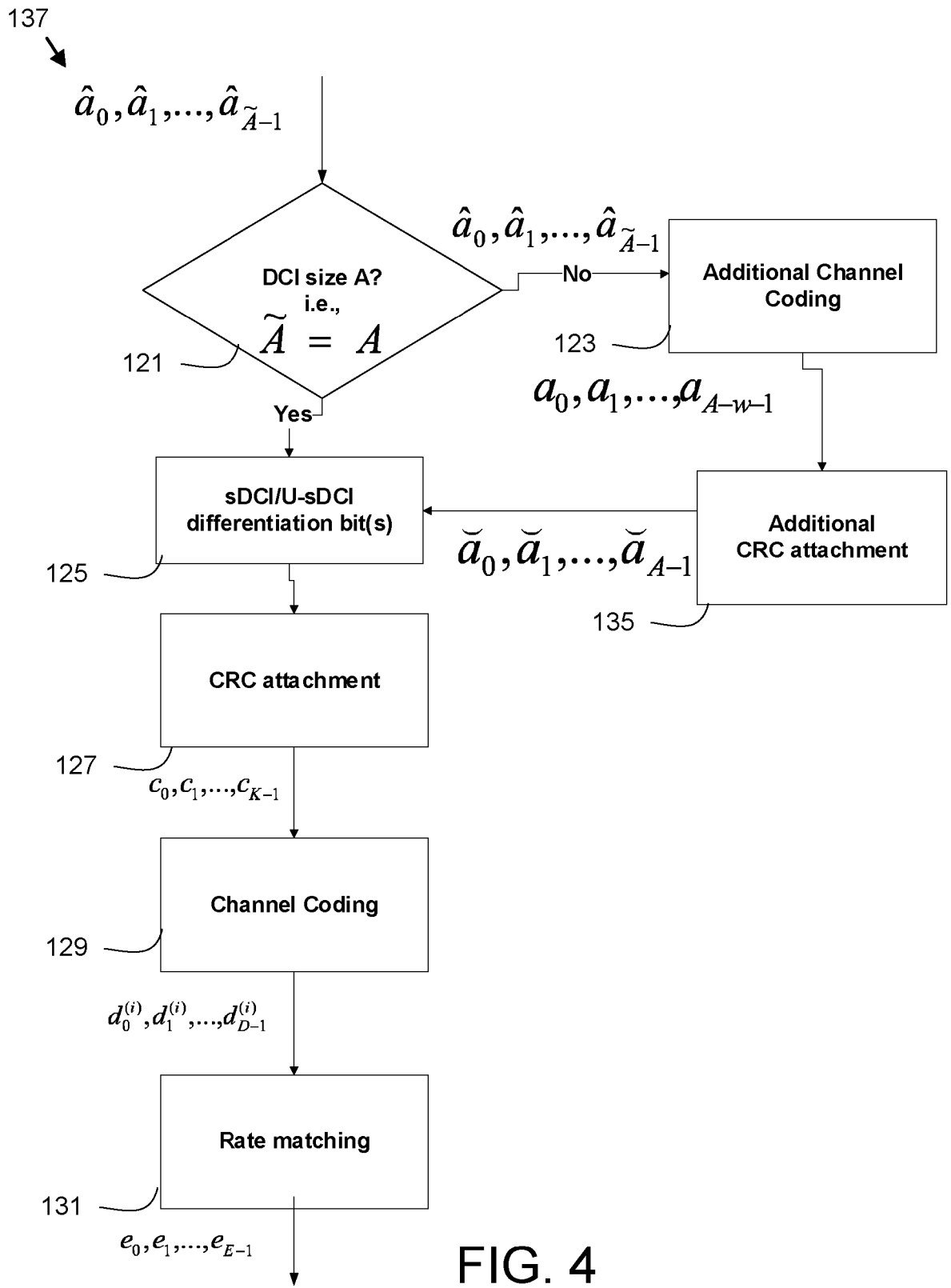
FIG. 4 is a schematic block diagram illustrating one alternate embodiment of a coding method.

FIG. 4 illustrates an alternate coding method 137. The steps of FIGS. 2 and 3 are shown. In the depicted embodiment, the u-sDCI CRC is composed of two constitutional CRC sub-fields—a first CRC sub-field (the additional CRC described in FIG. 3) is length w and a second CRC sub-field is of the same length and has a CRC polynomial as the sDCI CRC—in this case additional DCI type differentiation bit(s) can be used (after length w CRC attachment first CRC-subfield, and prior to second CRC-subfield CRC attachment) to reduce UE implementation complexity (e.g., blind detection and possibly increased falsing (probability of false alarm in control decoding, where e.g., a UE mistakenly detects a control message as its own control message) due to smaller length w CRC for differentiating u-sDCI).

FIG. 5 illustrates aligning sDCI and u-sDCI size by coding a part of the u-sDCI 111. To achieve low latency in URLLC, retransmissions may be allowed/configured/scheduled/Medium Access Control (MAC)-Control Element (CE) activated before reception of acknowledge/no acknowledge (ACK/NACK) in uplink or in downlink. The reliability requirement such as a target Block Error Rate (BLER) for retransmissions may be more relaxed e.g., compared to the initial transmission of a transport block (TB). In one example, a TB retransmission may be scheduled with u-sDCI 111 or sDCI 113 or even regular DCI. A retransmission of a TB may be scheduled via a sDCI 113, a field in the sDCI 113 may indicate that the DL scheduling assignment/ UL grant is intended for URLLC.

If SPS is enabled (or configured) for URLLC, the u-sDCI 111 for URLLC-Semi Persistent Scheduling (SPS)(e.g., SPS activation, or SPS release) may be scrambled by SPS-Radio Network Temporary Identifier (RNTI) and the u-sDCI 111 may contain a differentiator field 116 distinguishing the u-sDCI 111 from sTTI-O SPS (if different sDCI and u-sDCI sizes are used, no distinguishing field is needed for SPS activation/release). The URLLC-SPS may contain periodic locations in time (sTTIs), and each instance may be repeated "N" times in time (e.g., in consecutive sTTIs), where "N" can be configured (e.g., via URLLC-SPS configuration), alternatively, "N" may be signaled in a DCI/sDCI/u-sDCI such as the SPS activation command. Each repetition may be acknowledged separately or an acknowledgement may be sent once the TB is correctly decoded (e.g., after a fraction of repetitions). In one example, Hybrid Automatic Repeat Request (HARQ)-ACK transmission and timing is based on only the last sTTI in the bundle (where a bundle composed of initial and retransmissions of a TB corresponding to one SPS occasion).

In case of collision of one repetition (DL or UL) with a dynamically grant/assignment for the same HARQ process if the dynamic grant was a u-sDCI 111, that instance of repetition is dropped. If more than a certain number/fraction (called "N_drop" in this document) of repetitions corresponding to a transport block (TB) are dropped, the UE may not transmit the remaining repetitions in UL, or may not attempt to decode the remaining retransmissions. "N_drop" may be fixed in specifications/data target BLER dependent (e.g., N_drop for lower target BLER may be lower than that of higher target BLER both for URLLC services with different BLER targets).

In an embodiment, URLLC-SPS is (re)activated/released via "N" u-sDCIs 111/control signals sent in a plurality of sTTIs. The corresponding SPS assignment verification can be done over all or part of the u-sDCIs/control signals sent in the plurality of the sTTIs. The verification procedure includes checking the selected fields for verification against known field values.

In one embodiment, the u-sDCI fields used for verification may be different among the multiple u-sDCIs/control signals sent in the plurality of the sTTIs. In another embodiment, the same u-sDCI fields are used over the plurality of sTTIs for SPS assignment verification. In another embodiment, the same u-sDCI fields are used over "M" sTTIs of the plurality of sTTIs/"M" out of "N" instances of u-sDCIs 111 for SPS assignment verification, where "M" is less than the number of sTTIs in the plurality of sTTIs/"M" is less than "N". In another embodiment, the UE verifies the SPS assignment if it has verified SPS verification fields over at least "M" sTTIs of the plurality of sTTIs or "M" instances of the control signal for SPS assignment verification, where "M" is less than the number of sTTIs in the plurality of sTTIs.

Figure 6:
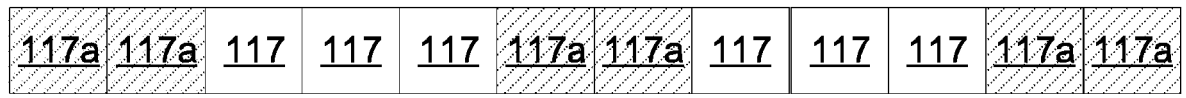
FIG. 6 is a schematic block diagram illustrating one embodiment of repetition in sTTI.

FIG. 6 illustrates one embodiment of repetition in sTTI 117. URLLC-SPS sTTI 117*a* are depicted for a repetition factor 2. For Demodulation Reference Signal (DMRS)-based shortened Physical Downlink Shared Channel (sPDSCH), if repetition is specified/configured/signaled, DMRS-pattern across the repetitions is known to the UE. In another embodiment, the total number of BDs for URLLC service per sTTI 117 is configured, and the total number of BDs for normal sTTI operation is given by the total number of BDs in an sTTI 117 minus the number of BDs corresponding to the URLLC service. If the URLLC service is disabled (e.g., by configuration), the total number of BDs is available for normal sTTI operation.

In sTTI LTE, the search space in an sTTI 117 is also limited to 16 sCCEs. And each shortened Control Channel Element (sCCE) is either 4 or 6 Resource Blocks (RB). The sPDCCH RB-set can be large (up to system BW). In case of supporting a large Aggregation Level (AL), such as 16 AL for URLLC, scheduling only one AL=16 for URLLC would occupy the whole search space if the same search space is used for URLLC and sTTI services, prohibiting other UEs/services to be scheduled/(SPS)activated.

In one embodiment, if the UE is configured for URLLC services, the search space can be set to a larger value "N" sCCEs ("N" can be set in specifications, e.g., N=min (32 sCCEs, floor (system BW/{sCCEs size in RBs}) or "N" can be configured).

In another embodiment, the sTTI 117 normal sDCI candidates are only restricted to the first search space (which is limited to 16 sCCEs) and if URLLC is configured in addition to the sTTI, there is a second search space (e.g., composed of "M" sCCEs) added to the first search space. A u-sDCI candidate may be in either of the first and second search spaces or may span across both of the first and the second search spaces. The first and second search spaces may be overlapping (partially or completely) or non-overlapping. In case the first and second search spaces are overlapping, an sCCE of the first search space may (or may not be) be aligned (same set of RBs) as another sCCE in the second search space.

Timing Advance Aspects for sTTI

One embodiment of minimum processing time and maximum supported timing advance combinations given in Table 1 below.

TABLE 1

| Reduced processing time and short TTI configuration | Min. Processing time | $TA_{max}$ |
| --- | --- | --- |
| 1 ms TTI with reduced processing time | N + 3 | 6144*Ts |
| slot TTI | N + 4 | 9520*Ts |
| Subslot TTI Set 1 | N + 4 | 2048*Ts for N + 4 |
|  | N + 6 | 10816*Ts for N + 6 |
| Subslot TTI Set 2 | N + 6 | 5120*Ts for N + 6 |
|  | N + 8 | 13888*Ts for N + 8 |

Table 1 is based on a minimum processing time assumption (i.e. N+x) and Timing Advance max ($TA_{max}$) for reduced processing time and shortened TTI. For subslot TTI 117, two different sets (Set 1 & Set 2 in Table 1) of minimum processing time and maximum Timing Advance (TA) may be employed.

The UE may indicate the support of either Set 1 or Set 2 for subslot TTI, depending on the shortened Physical Downlink Control Channel (sPDCCH) RB set configuration (separate Set indication for 1OS CRS-based sPDCCH, 2OS CRS-based sPDCCH and DMRS-based sPDCCH) as well as potentially depending on the reference signal type of subslot PDSCH (i.e. DMRS-based subslot PDSCH/CRS-based subslot PDSCH). The minimum processing time assumption for subslot TTI operation (i.e. N+4, N+6 or N+8) is configured by Radio Resource Control (RRC).

For a UE configured with N+4 timing with Subslot TTI Set 1, then if its TA becomes larger than 2048*Ts, the UE is not expected to receive sPDSCH, and/or monitor sDCI 113, and/or perform any sTTI/URLLC operation (e.g., SPS). For a UE configured with N+6 timing with Subslot TTI Set 1, then if its Timing Advance (TA) becomes larger than 10816*Ts, the UE is not expected to receive sPDSCH, and/or monitor sDCI 113, and/or perform any sTTI/URLLC operation (e.g., SPS).

For a UE configured with N+6 timing with Subslot TTI Set 2, then if its TA becomes larger than 5120*Ts, the UE is not expected to receive sPDSCH, and/or monitor sDCI 113, and/or perform any sTTI/URLLC operation (e.g., SPS). For a UE configured with N+8 timing with Subslot TTI Set 2, then if its TA becomes larger than 13888*Ts, the UE is not expected to receive sPDSCH, and/or monitor sDCI 113, and/or perform any sTTI/URLLC operation (e.g., SPS). For a UE configured with N+8 timing with Subslot TTI Set 2, then if its TA becomes larger than 13888*Ts, the UE is not expected to receive sPDSCH, and/or monitor sDCI 113, and/or perform any sTTI/URLLC operation (e.g., SPS).

In one embodiment, the TA value includes the initial transmission timing that is set relative to the received downlink timing based on a timing advance command received in the Random Access Response (RAR) message, MAC timing advance update commands which are made relative to the latest uplink timing, and autonomous uplink transmission timing adjustment to track changes in the received downlink timing.

The timing adjustment indication in the RAR message indicates the initial $N_{TA}$ used for a timing advance group (TAG). The timing advance command for a TAG indicates the change of the uplink timing relative to the current uplink timing for the TAG as multiples of $16T_s$ (TA granularity).

In case of random access response, an 11-bit timing advance command, $T_A$, for a TAG indicates $N_{TA}$ values by index values of $T_A=0, 1, 2, \ldots, 256$ if the UE is configured with a SCG, and $T_A=0, 1, 2, \ldots, 1282$ otherwise, where an amount of the time alignment for the TAG is given by $N_{TA}=T_A\times16$.

In other cases, a 6-bit timing advance command, $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31)\times16$. Here, adjustment of $N_{TA}$ value by a positive or a negative amount indicates advancing or delaying the uplink transmission timing for the TAG by a given amount respectively.

In LTE, transmission of the uplink radio frame number i from the UE shall start $(N_{TA}+N_{TA\ offset})\times T_s$ seconds before the start of the corresponding downlink radio frame at the UE, where $0\leq N_{TA}\leq 4096$ if the UE is configured with a SCG and $0\leq N_{TA}\leq 20512$ otherwise. For frame structure type 1 (e.g., FDD) $N_{TA\ offset}=0$ and for frame structure type 2 (e.g., TDD) $N_{TA\ offset}=624$ unless stated otherwise.

In another embodiment, RRC reconfiguration is not triggered for "x" sTTIs/subframes after the TA becomes larger than the maximum TA. "x" can be fixed in specifications, or configured or determined based on a UE capability. "x" can be dependent on processing timeline (e.g., "N+4", "N+6", "N+8") and/or on subslot TTI Set 1 or 2.

In another embodiment, the UE still monitors sDCI 113 if its TA has become larger than the maximum TA corresponding to the configured processing timeline, e.g., at least in case of SPS associated with sTTI operation. In an embodiment, the UE once validates the SPS associated with UL sTTI operation, it does not transmit the corresponding UL signal until its TA becomes less than the maximum TA associated with the configured processing time line (e.g., if its TA becomes smaller than the maximum TA before expiry of a timer).

In another embodiment, if the UE is configured with N+4 timing with Subslot TTI Set 1, then if its TA becomes larger than 2048*Ts, the UE can switch to N+6 timing as long as its TA is less than 10816*Ts. In one example, a hysteresis region of h*Ts (or h1*Ts) may be used and the UE switches back to N+4 timing if the TA value falls below (2048−h)*Ts. In one example, the UE may inform the eNB when UE's TA becomes larger (or when the UE expects/estimates its TA has become larger) than 2048*Ts or larger than (2048−h1)*Ts by triggering a Timing Advance or Timing headroom report including a value based on the current time advance value (TA) or gap to the TAmax value (TAmax−TA). TA corresponds to the latest $N_{TA}$ value in the UE i.e. $N_{TA,new}$. The reported values in the TA report may have TA granularity of e.g., 16 Ts. The TA granularity of the values in the TA report may be same as the granularity of the values in the TA command. The TA report provides an indication to the eNB that the UE needs to be re-configured with an updated minimum processing time. In one example, the UE may initiate a random access procedure and transmit the TA report MAC control element in a Msg 3 Physical Uplink Shared Channel (PUSCH) transmission.

In another embodiment, if the UE is configured with N+6 timing with subslot TTI Set 1, then if its TA becomes larger than 6144*Ts but less than 10816*Ts, and if the UE is configured with shortened processing time, the UE is not expected to monitor DCI in PDCCH UE-specific search space, however, it monitors sDCI 113 in PDCCH UE-specific search space. In one example, a hysteresis region of h2*Ts (or h3*Ts) may be used and the UE resumes to monitor DCI in PDCCH UE-specific search space with reduced processing time if the TA value falls below (6144−h2)*Ts. In one example, if the UE is configured with shortened processing time and its TA becomes larger than 6144*Ts, the UE can switch to regular N+4 processing time for PDCCH received in UE-specific search space. In one example, the UE may inform the eNB when UE's TA becomes larger than 6144*Ts or larger than (6144−h3)*Ts by triggering a Timing Advance or Timing headroom report including a value based on the current time advance value (TA) or gap to the TAmax value (TAmax−TA). TA corresponds to the latest $N_{TA}$ value in the UE i.e. $N_{TA,new}$. The reported values in the TA report may have TA granularity of e.g., 16 Ts. The TA granularity of the values in the TA report may be same as the granularity of the values in the TA command. The TA report provides an indication to the eNB that the UE needs to be re-configured with an updated minimum processing time. In one example, the UE may initiate a random access procedure and transmit the TA report MAC control element in a Msg 3 PUSCH transmission.

In one embodiment, the UE may adjust the timing of its uplink transmission at subframe #n+6 for a TA Command received in subframe #n. In sTTI, the UE may adjust the timing of its sTTI uplink transmission at subframe #n+6 for a TA Command received in subframe #n. If a UE is configured with URLLC, The UE may adjust the timing of its sTTI uplink transmission at subframe #n+x for a TA Command received in subframe #n, wherein x<=6, and x can be fixed in specifications, can be configurable or can be a UE capability. In another embodiment, the UE may adjust the timing of all uplink transmissions at subframe #n+6.

In one embodiment, the UE may adjust the timing of its transmissions with a relative accuracy better than or equal to 4*Ts seconds to the signaled timing advance value compared to the timing of preceding uplink transmission. In one embodiment, the preceding uplink transmission is the latest 1 ms uplink transmission. In another embodiment, the preceding uplink transmission is the latest sTTI uplink transmission. In yet another embodiment, the preceding uplink transmission is the latest sTTI/1 ms uplink transmission. In one embodiment, the timing advance command indicates the change of the uplink timing relative to the current uplink timing as multiples of $16T_s$.

Figure 7:
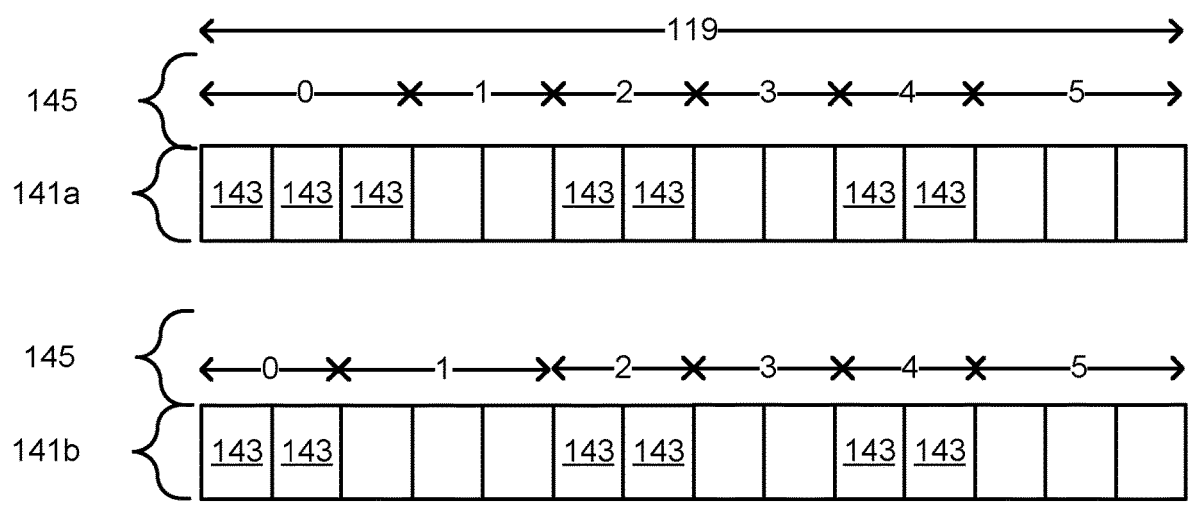
FIG. 7 is a schematic diagram illustrating one embodiment of TTI patterns.

FIG. 7 illustrates sTTI patterns 141 based on number of PDCCH symbols relative to sTTI indexes 145 in a subframe 119. In one embodiment, if DCI (for 1 ms operation) is wrongly decoded as DL sDCI 113 by the UE, but it is already 2/3-symbol PDCCH, the UE is not expected to receive sPDSCH or single-TTI DL sDCI 113 when PDCCH region is the same as sTTI length. If the sDCI 113 is multi-TTI sDCI 113, the sPDSCH assignment is applicable to sTTIs other than sTTI0.

In another embodiment, if sDCI 113 and DCI are distinguished via a field 143 in DCI/sDCI (e.g., 1 bit: 0 for DCI, and 1 for sDCI), in sTTI #0 (shown below) the SPS validation procedure includes validating sDCI/DCI distinguishing field in the PDCCH set to DCI if only 1 ms-SPS is configured and/or sDCI 113 if only sTTI-SPS is configured.

In another embodiment, for SPS assignment (e.g., activation or release), the DCI (corresponding to 1 ms-SPS)/sDCI (corresponding to sTTI-SPS), a field including a certain number of bits (e.g., 3 bits) and/or bit states is used to distinguish DCI vs. sDCI 113: e.g., for DCI, the field is set to '000', and for sDCI 113 the field is set to '111'.

If SPS operation corresponding to 1 ms TTI is configured and SPS operation corresponding to shortened TTI or URLLC is also configured for a UE, if the UE is configured with sTTI operation, and if sDCI 113 and DCI are distinguished via a field in DCI/sDCI (e.g., 1 bit: 0 for DCI, and 1 for sDCI), in sTTI #0.

If the UE receives a DCI associated with SPS-RNTI, validation fields should be set such that 1 ms-SPS and sTTI-SPS assignments can be validated against each other with high probability (e.g., by having enough number of bits to follow a constant/known pattern of '0', and '1' for SPS-sDCI, and the pattern/fields used for verification are very different or have a large hamming distance than the validation pattern/fields used for 1 ms-SPS). This approach may be used when only 1 ms-SPS/or only sTTI-SPS is configured.

If SPS operation corresponding to 1 ms TTI is configured and SPS operation corresponding to shortened TTI or URLLC is not configured for a UE, if the UE is configured with sTTI operation. If the UE receives a DCI associated with SPS-RNTI, and if the UE validates the SPS assignment as 1 ms-SPS, the UE shall not validate the SPS assignment if the DCI/sDCI 115 distinguishing field does not indicate DCI.

sTTI-SPS Collision with 1 ms

In one embodiment, in case of collision between non-SPS PUSCH/PUCCH and SPS sPUSCH in the same subframe on a given carrier, the UE shall transmit non-SPS 1 ms TTI transmission and drop/stop SPS sPUSCH transmission if it is configured/specified and the SPS has been activated at least x sTTIs before. "x" can be configured or specified. In another embodiment if the SPS sPUSCH has been activated before the PUSCH grant, the SPS sPUSCH is dropped in case of collision with non-SPS PUSCH otherwise non-SPS PUSCH is dropped.

Figure 8A:
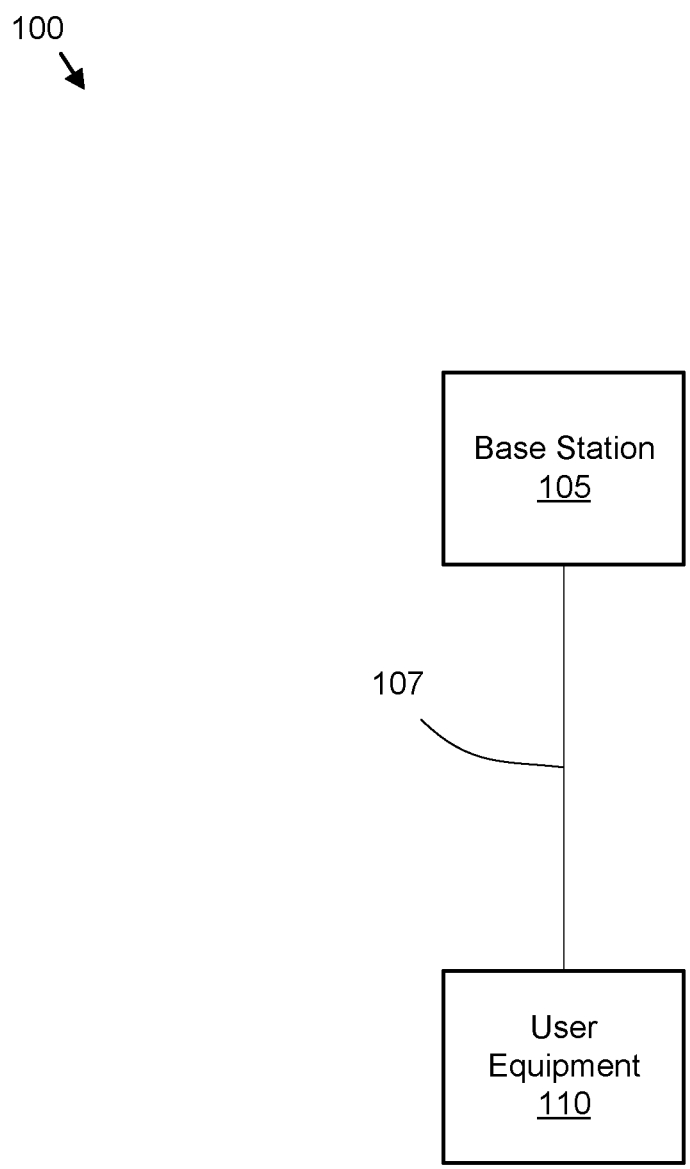
FIG. 8A is a schematic block diagram illustrating one embodiment of a communication system.

FIG. 8A is a schematic block diagram illustrating one embodiment of a communication system 100. The system 100 includes a base station 105 and UE 110. The base station 105 may be a gNodeB (gN) base station and/or an evolved node B (eNB) LTE base station. The UE 110 may be a mobile telephone, a machine-type communications (MTC) device, a tablet computer, a laptop computer, and embedded communication devices in automobiles, kiosks, appliances, and the like. The base station 105 and the UE 110 may communicate over a network 107.

Figure 8B:
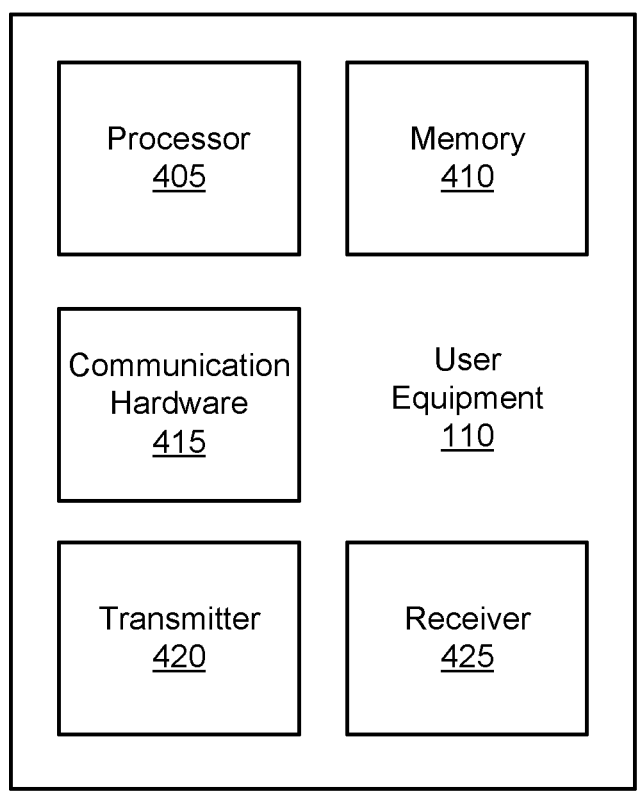
FIG. 8B is a schematic block diagram illustrating one embodiment of user equipment.

FIG. 8B is a schematic block diagram illustrating one embodiment of the UE 110. In the depicted embodiment, the US 110 includes a processor 405, a memory 410, communication hardware 415, a transmitter 420, and receiver 425.

The memory 410 may include a semiconductor storage device, a hard disk drive, or combinations thereof. The memory 410 may store code. The processor 405 may execute the code. The communication hardware 415 may communicate with the transmitter 420 and/or receiver 425. The transmitter 420 may transmit wireless signals. The receiver 425 may receive wireless signals.

Figure 9:
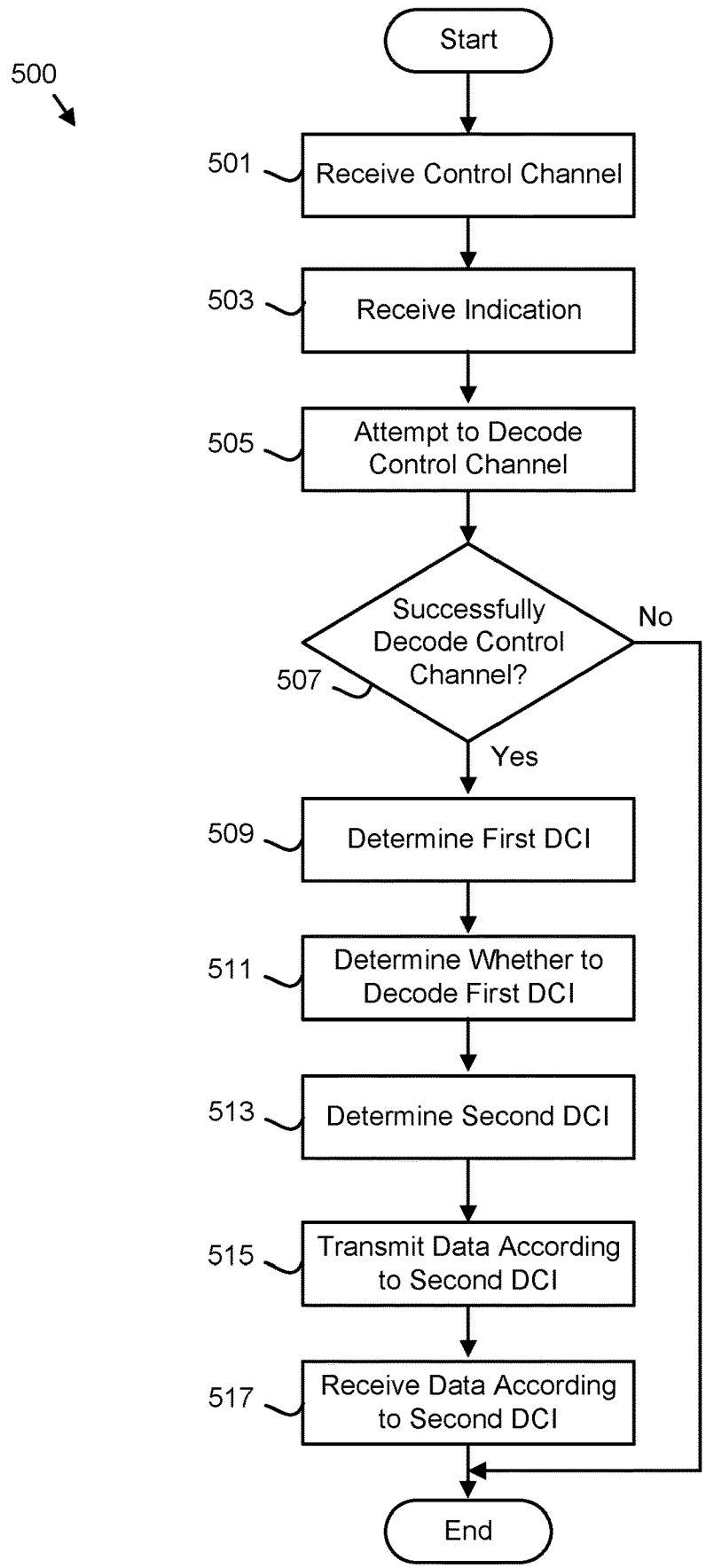
FIG. 9 is a schematic flow chart diagram illustrating one embodiment of a data communication method.

FIG. 9 is a schematic flow chart diagram illustrating one embodiment of a data communication method 500. The method 500 may determine whether to decode a second DCI with a number of bits based on a first decoded DCI. The method 500 may be performed by the processor 405 of the UE 110 and/or the processor 405 of the base station 105.

The method 500 starts, and in one embodiment, the processor 405 receives 501 at the UE 110 a control channel with a first AL in a TTI. The processor 405 of the base station 105 may transmit the control channel. In one embodiment, the control channel comprises a first downlink control information (DCI) with a first number of bits and a second DCI with a second number of bits. The first DCI bits may be determined based on encoding the second DCI bits. In addition, the processor 405 of the base station 105 may transmit and the processor 405 of the UE 110 may receive 503 an indication in the first DCI indicating whether to decode the first DCI. In a certain embodiment, the processor 405 receives 503 an indication in the first DCI indicating whether to decode the first DCI.

The processor 405 may attempt 505 to decode the control channel. In one embodiment, the processor 405 of the UE 110 attempts 505 to decode control channels of the first DCI size and the second DCI size, wherein the first DCI size corresponds to a first DCI type and the second DCI size corresponds to a second DCI type. The control channel may be decoded based on one or more of a first bit scrambling initialization corresponding to the first DCI type and a second bit scrambling initialization corresponding to the second DCI type. In one embodiment, the UE determines whether to decode the first DCI to determine a second DCI if the first bit scrambling initialization is used in decoding the control channel. Otherwise the UE determines not to decode the first DCI.

In one embodiment, the first DCI comprises a first sequence of bits and a second sequence of bits. In addition, decoding the first DCI may comprise decoding the first sequence of bits, and not decoding the second sequence of bits. The processor 405 may determine 507 whether the control channel is successfully decoded.

In one embodiment, the control channel is decoded according to decoding operation for a polar encoded sequence. In a certain embodiment, the first DCI has "L" bits and the second DCI has "K" bits. In a particular embodiment, the "L-K" bits are mapped to frozen bit positions of the polar kernel encoder.

If the processor 405 determines 507 the control channel is not successfully decoded, the method 500 ends. If the processor 405 determines 507 the control channel is successfully decoded, the processor 405 may determine 509 a first DCI with a first number of bits based on the received control channel. In addition, the processor 405 may determine 511 whether to decode the first DCI to determine a second DCI with a second number of bits based on the first DCI. The processor 405 may determine 513 the second DCI with a second number of bits based on the decoded first DCI if determined to decode the first DCI. In one embodiment, determining 513 the second DCI based on the decoded first DCI further comprises decoding the first DCI to get a first set of bits and removing CRC bits from the first set of bits as described in FIG. 3.

In one embodiment, the CRC associated with the first DCI is of a first length, and has a first CRC polynomial. In a certain embodiment, the CRC associated with the second DCI is of a second length, and is comprised of two constitutional CRC sub-fields. In one embodiment, a first CRC sub-field is of a third length. In a particular embodiment, a second CRC sub-field is of the first length and has the first CRC polynomial. In a certain embodiment, removing CRC bits from the first set of bits comprises removing the CRC bits corresponding to the first CRC sub-field.

The processor 405 of the UE 110 further transmits 515 and the processor 405 of the base station 104 receives data according to the second DCI if the second DCI is an uplink (UL) grant or the processor 405 of the base station 105 transmits and the processor 405 of the UE 110 receives 517 data according to the second DCI if the second DCI is a downlink (DL) assignment and the method 500 ends.

Figure 10:
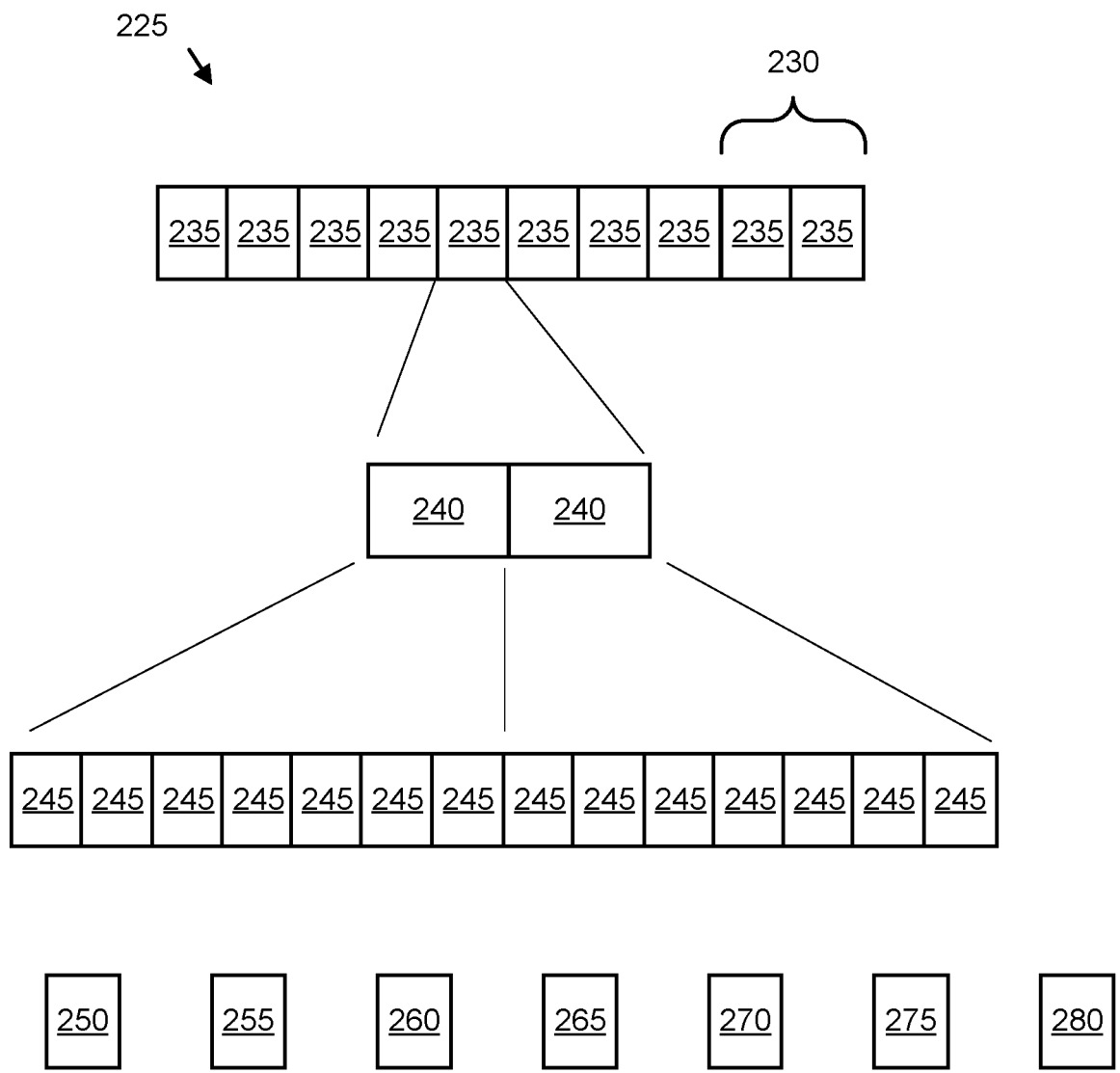
FIG. 10 is a schematic block diagram illustrating one embodiment of transmission data.

FIG. 10 is a schematic block diagram illustrating one embodiment of transmission data. The transmission data may be encoded for transmission and/or organized as a data structure. The transmission data includes a frame 225. The frame 225 includes 10 subframes 235. The two subframes 235 may comprise TTI 230. Each subframe 235 comprises two slots 240. Each slot comprises seven OFDM symbols 245.

The transmission data may further include an AL 250, a TB 255, a TA 260, a control channel 265, a TA command 270, the DCI 275, and the configuration 280. The AL 250, TB 255, TA 260, control channel 265, TA command 270, DCI 275, and configuration 280 may be embodied in one or more OFDM symbols 245. The OFDM symbols 245 may transmit data.

The embodiments may comprise:
A method comprising:
receiving, by use of a processor, at User Equipment (UE), a control channel with a first aggregation level (AL) in a Transmission Time Interval (TTI);
attempting to decode the control channel;
in response to the control channel being successfully decoded,
determining a first downlink control information (DCI) with a first number of bits based on the received control channel;
determining whether to decode the first DCI to determine a second DCI with a second number of bits based on the first DCI;
determining the second DCI with a second number of bits based on the decoded first DCI if determined to decode the first DCI;
transmitting data according to the second DCI if the second DCI is an uplink (UL) grant; and
receiving data according to the second DCI if the second DCI is a downlink (DL) assignment.

The method of claim 1, the method further comprising receiving an indication in the first DCI indicating whether to decode the first DCI.

The method of claim 1, wherein the second number of bits of the second DCI is smaller than the first number of bits of the first DCI.

The method of claim 1, wherein the number of bits of the second DCI is determined based on the first AL.

The method of claim 1, wherein the UE attempts to decode control channels of a first DCI size and a second DCI size, wherein the first DCI size corresponds to a first DCI type and the second DCI size corresponds to a second DCI type.

The method of claim 1, wherein decoding the control channel further comprises decoding the control channel based on:
a first bit scrambling initialization corresponding to the first DCI type; and
a second bit scrambling initialization corresponding to the second DCI type.

The method of claim 6, wherein the UE determines whether to decode the first DCI to determine a second DCI if the first bit scrambling initialization is used in decoding the control channel, otherwise the UE determines not to decode the first DCI.

The method of claim 1, wherein:
the first DCI comprises a first sequence of bits and a second sequence of bits; and
decoding the first DCI comprises decoding the first sequence of bits, and not decoding the second sequence of bits.

The method of claim 1, wherein determining the second DCI based on the decoded first DCI further comprises:
decoding the first DCI to get a first set of bits; and
removing cyclic redundancy check (CRC) bits from the first set of bits.

The method of claim 9, wherein:
the CRC associated with the first DCI is of a first length, and has a first CRC polynomial;
the CRC associated with the second DCI is of a second length, and is comprised of two constitutional CRC sub-fields;
a first CRC sub-field is of a third length; and
a second CRC sub-field is of the first length and has the first CRC polynomial; and
removing CRC bits from the first set of bits comprises removing the CRC bits corresponding to the first CRC sub-field.

The method of claim 1, wherein:
the control channel is decoded according to decoding operation for a polar encoded sequence;
the first DCI has "L" bits and the second DCI has "K" bits; and
the "L-K" bits are mapped to frozen bit positions of the polar kernel encoder.

An apparatus comprising:
a processor performing:
receiving at User Equipment (UE), a control channel with a first aggregation level (AL) in a Transmission Time Interval (TTI);
attempting to decode the control channel;
in response to the control channel being successfully decoded,
determining a first downlink control information (DCI) with a first number of bits based on the received control channel;
determining whether to decode the first DCI to determine a second DCI with a second number of bits based on the first DCI;
determining the second DCI with a second number of bits based on the decoded first DCI if determined to decode the first DCI;
transmitting data according to the second DCI if the second DCI is an uplink (UL) grant; and
receiving data according to the second DCI if the second DCI is a downlink (DL) assignment.

The apparatus of claim 12, the processor further receiving an indication in the first DCI indicating whether to decode the first DCI.

The apparatus of claim 12, wherein the second number of bits of the second DCI is smaller than the first number of bits of the first DCI.

The apparatus of claim 12, wherein the number of bits of the second DCI is determined based on the first AL.

The apparatus of claim 12, wherein the UE attempts to decode control channels of a first DCI size and a second DCI size, wherein the first DCI size corresponds to a first DCI type and the second DCI size corresponds to a second DCI type.

The apparatus of claim 12, wherein decoding the control channel further comprises decoding the control channel based on:
  a first bit scrambling initialization corresponding to the first DCI type; and
  a second bit scrambling initialization corresponding to the second DCI type.

The apparatus of claim 17, wherein the UE determines whether to decode the first DCI to determine a second DCI if the first bit scrambling initialization is used in decoding the control channel, otherwise the UE determines not to decode the first DCI.

The apparatus of claim 12, wherein:
  the first DCI comprises a first sequence of bits and a second sequence of bits; and
  decoding the first DCI comprises decoding the first sequence of bits, and not decoding the second sequence of bits.

A method comprising:
  transmitting, by use of a processor, at a base station, a control channel with a first aggregation level (AL) in a Transmission Time Interval (TTI), wherein the control channel comprises a first downlink control information (DCI) with a first number of bits based on the received control channel and a second DCI with a second number of bits based on the first DCI;
  receiving data according to the second DCI if the second DCI is an uplink (UL) grant; and
  transmitting data according to the second DCI if the second DCI is a downlink (DL) assignment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method at a device, the method comprising:
  receiving a Semi-Persistent Scheduling (SPS) configuration for a first set of Physical Uplink Shared Channel (PUSCH) transmissions;
  receiving a downlink control information (DCI) scheduling a second Uplink (UL) transmission;
  determining if any of the first set of PUSCH transmissions overlap with a second PUSCH transmission;
  in response to the determining a PUSCH transmission of the first set of PUSCH transmissions overlaps with the second UL transmission; and
  determining whether to drop the PUSCH transmission of the first set of PUSCH transmissions based on the configuration.

2. The method according to claim 1, wherein the second UL transmission is a PUSCH transmission.

3. The method according to claim 1, wherein the second UL transmission is a PUCCH transmission.

4. The method according to claim 1, wherein in response to determining to drop the PUSCH transmission of the first set of PUSCH, the second UL transmission is transmitted.

5. The method according to claim 1, wherein in response to determining to not drop the PUSCH transmission of the first set of PUSCH, the second UL transmission is dropped.

6. The method according to claim 1, wherein the first set of PUSCH transmissions corresponds to Ultra-Reliable Low Latency Communication (URLLC).

7. The method according to claim 1, wherein determining whether to drop the PUSCH transmission of the first set of PUSCH transmissions based on the configuration, further comprises determining whether to drop the PUSCH transmission of the first set of PUSCH transmissions based on the whether the SPS configuration has been activated at least 'x' time intervals.

8. The method according to claim 7, wherein 'x' is configured.

9. The method according to claim 2, wherein the PUSCH transmission of the first set of PUSCH transmissions and the PUSCH transmission of the second UL transmission are associated with the same Hybrid Automatic Repeat Request (HARQ) process.

10. The method according to claim 1, wherein the PUSCH transmission of the first set of PUSCH transmissions comprises 'N' repetitions of a transport block (TB).

11. The method according to claim 10, wherein 'N' is indicated in a DCI activating the SPS configuration.

12. The method according to claim 10, wherein the device would not transmit the remaining repetitions of the TB, if more than "N_drop" repetitions of the TB has been dropped.

13. An apparatus comprising:
  a processor;
  a memory storing code that is executable by the processor to perform:
    receiving a Semi-Persistent Scheduling (SPS) configuration for a first set of Physical Uplink Share Chanel (PUSCH) transmissions;
    receiving a downlink control information (DCI) scheduling a second Uplink (UL) transmission;
    determining if any of the first set of PUSCH transmissions overlap with a second PUSCH transmission;
    in response to the determining a PUSCH transmission of the first set of PUSCH transmissions overlaps with the second UL transmission; and
    determining whether to drop the PUSCH transmission of the first set of PUSCH transmissions based on the configuration.

14. The apparatus according to claim 13, wherein the second UL transmission is a PUSCH transmission.

15. The apparatus according to claim 13, wherein the second UL transmission is a PUCCH transmission.

16. The apparatus according to claim 13, wherein in response to determining to drop the PUSCH transmission of the first set of PUSCH, the second UL transmission is transmitted.

17. The apparatus according to claim 13, wherein in response to determining to not drop the PUSCH transmission of the first set of PUSCH, the second UL transmission is dropped.

18. The apparatus according to claim 13, wherein the first set of PUSCH transmissions corresponds to Ultra-Reliable Low Latency Communication (URLLC).

19. The apparatus according to claim 13, wherein determining whether to drop the PUSCH transmission of the first set of PUSCH transmissions based on the configuration, further comprises determining whether to drop the PUSCH transmission of the first set of PUSCH transmissions based on the whether the SPS configuration has been activated at least 'x' time intervals.

20. A computer program product comprising a non-transitory computer readable storage medium storing code executable by a processor to perform:
- receiving a Semi-Persistent Scheduling (SPS) configuration for a first set of Physical Uplink Shared Chanel (PUSCH) transmissions;
- receiving a downlink control information (DCI) scheduling a second Uplink UL transmission;
- determining if any of the first set of PUSCH transmissions overlap with a second PUSCH transmission;
- in response to the determining a PUSCH transmission of the first set of PUSCH transmissions overlaps with the second UL transmission; and
- determining whether to drop the PUSCH transmission of the first set of PUSCH transmissions based on the configuration.

* * * * *

UNITED STATES PATENT AND TRADEMARK OFFICE
CERTIFICATE OF CORRECTION

PATENT NO. : 11,432,276 B2
APPLICATION NO. : 16/899897
DATED : August 30, 2022
INVENTOR(S) : Hossein Bagheri and Vijay Nangia Page 1 of 1

It is certified that error appears in the above-identified patent and that said Letters Patent is hereby corrected as shown below:

In the Claims

In Claim 1, Column 15, Line 59, delete ";" and insert --; and--

In Claim 1, Column 15, Line 62, delete "; and" and insert --,--

In Claim 13, Column 16, Line 44, delete ";" and insert --; and--

In Claim 13, Column 16, Line 47, delete "; and" and insert --,--

In Claim 20, Column 17, Line 15, delete ";" and insert --; and--

In Claim 20, Column 17, Line 18, delete "; and" and insert --,--

Signed and Sealed this
Fifth Day of March, 2024

Katherine Kelly Vidal
*Director of the United States Patent and Trademark Office*